United States Patent [19]

Imai et al.

[11] 4,156,146

[45] May 22, 1979

[54] ARRANGEMENT FOR REPLACABLY MOUNTING OPERATING MEMBER ON A RADIATION SHIELDING BOX

[75] Inventors: Kashio Imai, Tachikawa; Masahiko Kimura, Tokyo; Takeshi Natori, Tokai; Koziro Yuki, Hitachi, all of Japan

[73] Assignees: Hitachi Cable, Ltd.; Doryokuro Kakunenryo Kaihatsu Jugyodan, both of Tokyo, Japan

[21] Appl. No.: 803,915

[22] Filed: Jun. 6, 1977

[30] Foreign Application Priority Data

Jun. 7, 1976 [JP] Japan .................................. 51-66241
Jun. 7, 1976 [JP] Japan .................................. 51-66242

[51] Int. Cl.² .................................................. G21F 7/04
[52] U.S. Cl. .................................... 250/516; 250/515; 250/506

[58] Field of Search ............... 250/506, 515, 516, 519; 29/401 F, 401 C; 176/87

[56] References Cited

U.S. PATENT DOCUMENTS 3,475,808  11/1969  Woolsey .............................. 250/516

Primary Examiner—Bruce C. Anderson
Attorney, Agent, or Firm—Sughrue, Rothwell, Mion, Zinn and Macpeak

[57] ABSTRACT

An arrangement for replacably mounting an operating member such as glove, bag or filter on the wall of a radiation shielding box includes a cylindrical fixed port fixedly provided on the wall, and a cylindrical replacement port having the operating member mounted thereon and screwed into the fixed port. The interface between the fixed port and the replacement port is sealed by a threaded, compressible elastic member such as rubber. The replacement port can be replaced with another new one when required.

15 Claims, 17 Drawing Figures

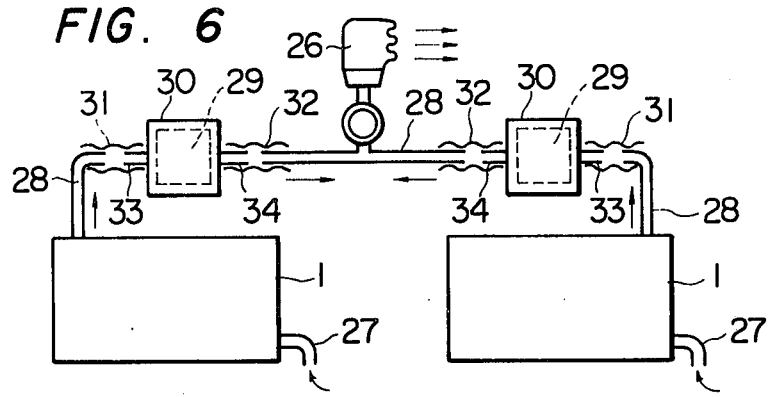
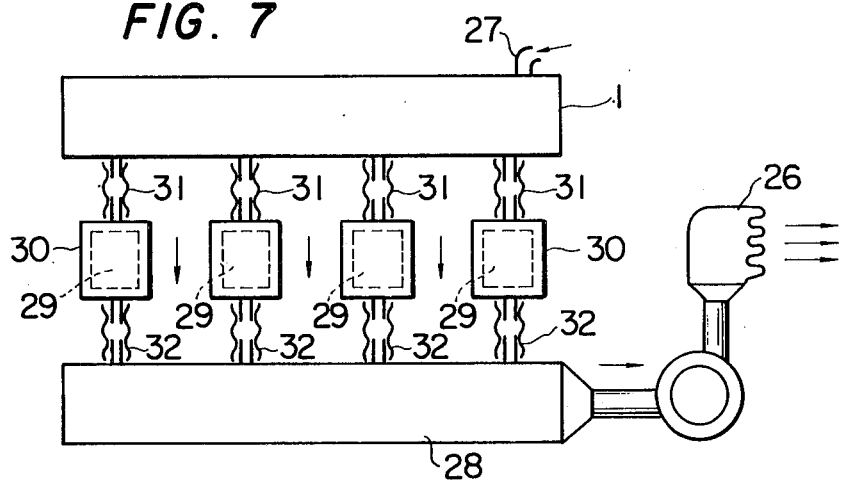
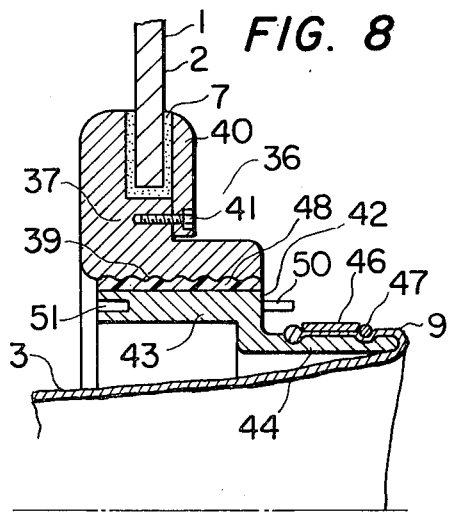
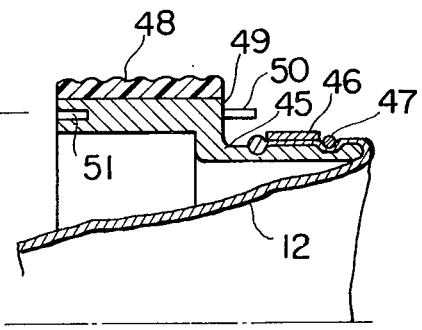

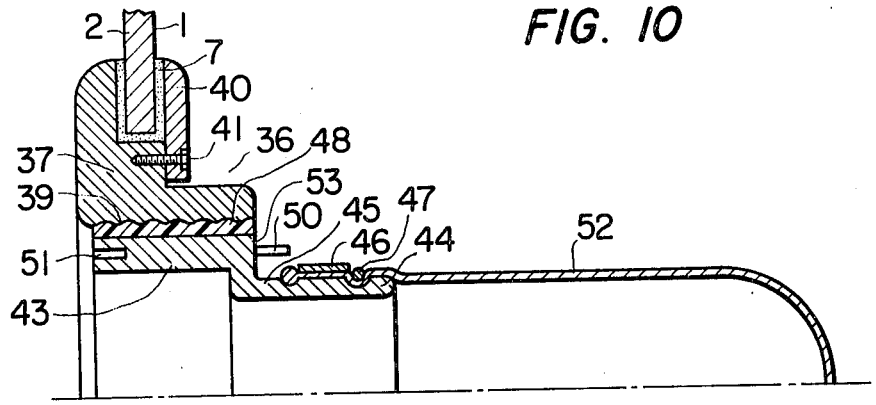

ARRANGEMENT FOR REPLACABLY MOUNTING OPERATING MEMBER ON A RADIATION SHIELDING BOX

BACKGROUND OF THE INVENTION

1. Field of the Invention

This invention relates to a structure for replacably mounting an operating member, such as glove, bag, filter, or the like in a wall port of a radiation shielding box.

2. Detailed Description of the Prior Art

In the case where a radioactive or other hazardous material must be indirectly handled or manipulated, such a material is placed in a shielded container, room or box and is handled by means of a glove, a bag, a filter, etc.

Heretofore, when it is required to handle or manipulate a shielded material in a shielding box, a transparent shielding box 1, as shown in FIG. 1, was employed. The outside of the box 1 is sealed. On the walls 2 of the box 1, there are provided gloves 3 into which the operator's hands can be put so that his hands can be inserted into the box 1. A bag of polyvinyl chloride 4 is for material to be inserted into or removed from the box, and a filter 5 for filtering polluted material is included in the shielding box. Such a shielding box as described above is well known in the art.

The box is provided with ports for securing the gloves and the bag. The construction of these ports will be described. As is shown in FIG. 2 and FIG. 3, a cylindrical fixed port 8 is fixedly inserted into an opening of the wall 2 through a ring-shaped packing 7 whose section is in the form of the letter "U". The base 9 of the glove 3 is placed over the outer wall of the fixed port and is tightly clamped with clamping parts, or an "O" ring 10 and a tightened sealing band 11.

With the shielding box thus constructed, an old glove is replaced by a new glove in accordance with the following method: First, the fingers of the new glove 12 are inserted into the old glove 3. Then, a sealing tool 18 consisting of disk-shaped steel plates 13 and 14, a cylindrical rubber section 15, and a screw member 17 with a handle 16 is inserted into the new glove 12. The rubber section 15 is inflated by operating the handle 15 as shown with the dotted line in FIG. 2, so that parts of the new and old gloves 12 and 3 are abutted against the inner wall of the fixed port 8 thereby to seal the box 1 from the outside. Then, the tightening band 11 is removed from the fixed port and the base 9 of the old glove 3 is folded about the "O" ring 10. In this operation, a slight amount of polluted material may be transferred to the surface of the base portion of the glove thus folded and to the outer wall of the fixed port 8. This polluted material must be completely removed from such parts.

Then, although not shown in the drawing, the base 19 of the new glove 12 is pulled over the base 9 of the old glove 3 folded and is placed on the periphery of the fixed port 8. Thereafter, the base 19 of the new glove thus placed is secured to the outer wall of the fixed port 8 with the tightening band 11. Then, the sealing tool 18 is released by operating the handle 16, and the old glove 3 is caught through the new glove 12 by the band so that the old glove 3 together with the "O" ring 10 is pulled into the box 1 and is allowed to drop therein. Finally, a new "O" ring is placed on the base 19 of the new glove. Thus the replacement of the old glove with the new glove has been completed.

In the case when an unnecessary material 20 is removed from the box 1, the material 20 is put in the bag 4 as shown in FIG. 3, and a suitable part 21 of the bag 4 above the material 20 is sealed and then cut off to take the material 20 out of the box as shown in FIG. 4.

In contrast, if it is necessary to put a material 22 into the bag 4 from outside, a suitable part 25 of the bag is sealed as shown in FIG. 5. Then the material 22 is, put into the box 1 through the hole 24 of a port section 23, and the part 25 thus sealed is cut off inside the box 1.

As the removal or insertion of the material is frequently carried out, it will be required to replace the bag 4 with a new one. In this case, of course, the old bag 4 is removed from the port section 23. As is apparent from FIGS. 3 through 5, the conventional bag mounting structure is such that the bag is fixedly secured directly to the port section 23 with the tightening band 11 and the "O" ring 10. Accordingly, the replacement of the bag 4 is carried out by the use of the sealing tool 18, similarly as in the replacement of the glove 3.

Gloves 3 and the bags 4 are also provided at places on the wall of the box 1 in view of various internal conditions, where normally the glove or the bag is not used. However, these gloves and bags will be deteriorated with the lapse of time and must be replaced with new ones some time.

The filter 5 is not concretely illustrated; however, the replacement of the filter will become apparent from the following description: The filter 5 is inserted into a filter fixing frame provided on the wall 2 of the shielding box 1, and a retainer is placed over the filter thus inserted, at the outside of the shielding box 1. Thus, the provision of the filter 5 is completed. When the filter 5 should be replaced with a new one owing to the decrease of its filtering capacity or its pollution, the replacement of the filter is carried out by removing or opening the retainer.

However, in the above-described port sections of the glove and the filter, a part of the polluted material may leak out of the shielding box 1 during the replacement operation. Therefore, the conventional method is not completely safe. Furthermore, the conventional method is not economical because the replacement requires a special tool and the gloves are often wasted. In addition, it is rather troublesome to periodically inspect a number of gloves, which are not used so often, for damage or deterioration, which leads to the necessity of a great deal of labor.

Known in the art is an arrangement in which air supplying ducts (pipes) 27 for introducing clean air into the boxes 1 in order to clean the atmosphere in the boxes and exhaust ducts 28 for discharging the polluted air out of the boxes 1 are connected to the respective boxes 1, as shown in FIG. 6. In the midpoint of the exhaust duct 28, a filter case 30 including a filter 29 is connected through rubber tubes 31 and 32, so that the polluted air is discharged out of the box 1 through a stack 26. When the used filter is replaced with a new one, it is essential that the worker should not directly touch the polluted filter. Therefore, the replacement of the polluted filter 29 is carried as follows. First, the rubber tubes 31 and 32 are sealed to block the flow of air therein, and the duct mouths 33 and 34 of the polluted filter case 30 are removed from the respective rubber tubes 31 and 32 thereby to remove the filter case 30. Then, the duct mouths of a new filter case are respectively coupled to the ends of the ends of the sealed rubber tubes 31 and 33. Thus, the replacement of the polluted filter case has been completed.

In the case where a large volume of polluted air should be cleaned, it goes without saying that the use of only one filter case is insufficient, and a number of filter cases, as shown in FIG. 7, must be disposed horizontally or vertically. Accordingly, in the replacement of these number of filter cases, the worker must move back and forth or up and down. Furthermore, the replacement of the filter cases should be done within as short a period of time as possible in view of the worker's health. However, according to the conventional replacement method, it takes a lot of time to complete the replacement, and the polluted air might leak out.

SUMMARY OF THE INVENTION

Accordingly, an object of this invention is to provide an improved port section in which all of the above-described drawbacks have been eliminated, and polluted material is scarecely leaked out of a shielding box.

According to the invention, a port section structure comprises a cylindrical fixed port on a wall of a shielding box, a cylindrical replacement port having an operating member and screwed into said fixed port, and an elastic member inserted in a compressed and deformed state between the fixed port and the replacement port.

According to another aspect of this invention, the cylindrical replacement port having an operating member includes a concave section and/or a convex section provided in at least one end face of the replacement port so as to be able to engage with a convex section and/or a concave section provided in another replacement port.

BRIEF DESCRIPTION OF THE DRAWINGS

In the drawings:

FIG. 6 is a schematic view of a conventional shielding box arrangement in which air supplying ducts for introducing clean air into the boxes 1 are connected to the respective boxes.

FIG. 7 is a schematic view of a conventional structure provided with a plurality of filters.

FIG. 8 is a vertical sectional view showing the essential components of a glove port section according to the invention.

FIG. 9 is also a vertical sectional view illustrating the essential parts of a glove replacement port.

FIG. 10 is a vertical sectional view illustrating the essential parts of a bag replacement port.

FIG. 11 is a vertical sectional view illustrating the essential parts of a sealing replacement port.

FIG. 12 is a vertical sectional view showing the essential parts of another example of the sealing replacement port.

FIG. 13 is a vertical sectional view illustrating the essential parts of a filter replacement port.

FIGS. 14 and 15 are vertical sectional views illustrating the essential parts of other examples of the filter replacement port.

DETAILED EXPLANATION OF THE PREFERRED EMBODIMENTS

Figure 1:
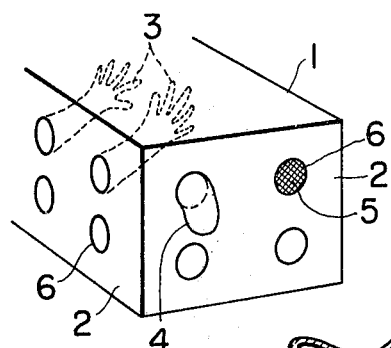
FIG. 1 is a schematic perspective view of a conventional shielding box applicable to this invention.
Figure 2:
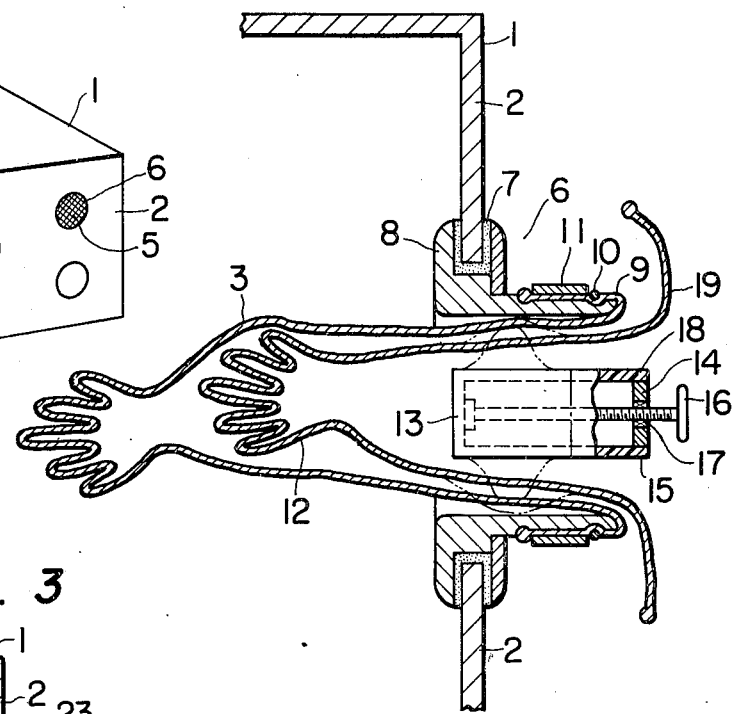
FIG. 2 is a sectional elevation view of the conventional fixing structure using a glove.
Figure 3:
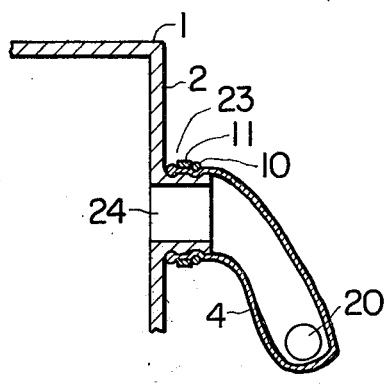
FIGS. 3 to 5 are each sectional views of conventional fixing structures using bags.
Figure 5:
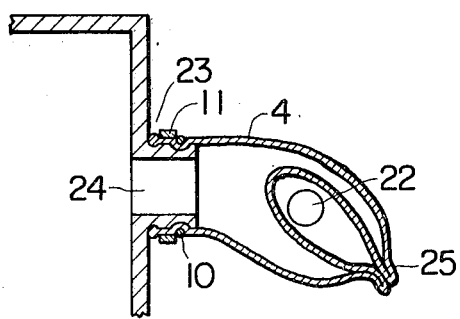
Figure 4:
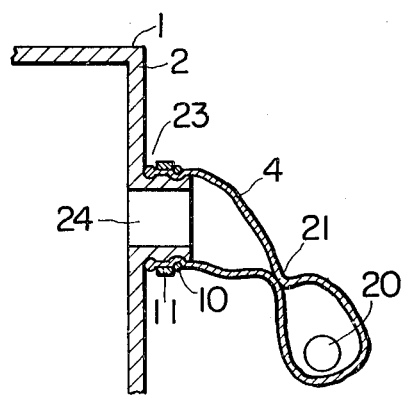

In FIG. 8, a fixed port 37 has a through-hole at its central portion, which communicates with the outside.

The inner wall 39 of the through-hole is threaded. Similarly as in the conventional fixed port, the fixed port 37 of the invention is fixed to the wall 2 of the box 1 through a ring-shaped packing 7, "U"-shaped in section, by a ring-shaped retainer 40 and bolts 41.

The glove replacement port 42 screwed into the threaded portion 39 of the fixed port 37 is composed of metal, hard plastics, or the like and comprises cylindrical parts 43 and 44 different in diameter. The base 9 of the glove 3 is, in a manner similar to the conventional one, fixedly mounted over the outer wall of the cylindrical part 44 having a smaller diameter by means of a sealing tightening band 46 and an "O" ring 47. A screw member 48 made of elastic material such as rubber is solidly mounted over the outer wall of the cylindrical part 43, and, has a larger diameter than the replacement port 42. In this case, the base 9 of the glove 3 may be directly fixed onto the surface of the cylindrical portion 44 without using the sealing band 46 and the O-ring 47. By means of this elastic screw member 48, the glove replacement port 42 can be screwed into the threaded portion 39 of the fixed port, and elastic deformation of the elastic screw member 48 serves to seal between the fixed port 37 and the glove replacement port 42. It goes without saying that the out-side diameter of the elastic screw member 48 is larger than the inside diameter of the fixed port 37.

The outside diameter of the cylindrical part 43 should be designed so that the thickness of the elastic screw member 48 is a predetermined value. Preferably, the inside diameter of the cylindrical port 43 is larger than that of the cylindrical part 44 to which the glove 3 is secured, while the length of the former is close to that of the latter 44.

The elastic screw member 48 can be manufactured in accordance with the well-known method in which the space between the cylindrical member 42 and a metallic mold is filled with rubber compound. The elastic screw member 48 is strongly adhered to the cylindrical member 42 by a conventional method so that the former is not caused to slide on the latter.

One end surface of the larger diameter cylindrical part 43 of the cylindrical member 42 is provided with at least one pin 50, while a corresponding hole whose diameter is slightly larger than the outside diameter of the pin 50 is provided on the other end surface of the cylindrical part 43. The pin and the hole may be of the other configuration if they can be engaged with each other. The elastic screw member may be adhered to the inner wall of the fixed port 37 instead of adhering to the cylindrical member 42, or may be adhered to both between the outer wall of the cylindrical part 43 and the inner wall of the fixed port 37. However, it is preferable that the elastic member is provided on the side of the replacement port 42, judging from the service life of the elastic member.

In view of the frictional coefficient between the elastic screw member 48 and the fixed port 37, it is possible to provide a thin film of polytetrafluoroethylene, known as "Teflon", on the surface of the elastic screw member, or to coat the surface of the elastic screw member with lubricant such as grease.

In replacing the glove 3 with a new one, the new glove 12, as shown in FIG. 9, is secured to the end face of the glove replacement port 42 screwed into the fixed port 37, and the front end of another new glove replacement port 49 having the same construction as the glove replacement port 42 is brought into contact with the latter port 42. In this case, by aligning the pin 50 of the replacement port 42 with the hole 51 of the new replacement port 49, the new replacement port 49 is screwed in the fixed port in such a manner that the old and new replacement ports 42 and 49 are simultaneously advanced as one unit. Accordingly, when the new replacement port 49 reaches a predetermined position, the old replacement port 42 is automatically removed from the fixed port 37, or readily removed if the old glove 3 is pulled through the new glove 12. Thus, the replacement of the glove can be achieved.

During this replacement operation, the sealing between the fixed port 37 and the replacement ports 42 and 49 are maintained perfect by the elastic deformation of the elastic screw member 48. Therefore, the shielded material will never leak out.

FIG. 10 shows another embodiment of this invention where essential elements of the glove port section are applied to the bag port section. Similarly as in the case of the gloves 3 and 12, a bag 52 for insertion or removal of a material or article is fixedly mounted on a cylindrical member 45 by means of a sealing tightening band 46 and an "O" ring 47.

In the case when the bag 52 becomes unserviceable by frequently inserting an article into or removing it from the shielding box, the bag must be replaced with a new one. This replacement can be readily achieved in a manner similar to that in the embodiment of FIGS. 8 and 9.

By the use of this bag 52, an article dropped into the shielding box 1, such as glove replacement ports 42, and 49, bag replacement port 53, or the like can be taken out of the shielding box 1.

FIG. 11 illustrates a modified sealing replacement port where a sealing member 58 is employed instead of the glove. The sealing replacement port 54 comprises a cylindrical member with a cylindrical part 55 larger in diameter and a cylindrical part 56 smaller in diameter. The smaller diameter cylindrical part 56 has the sealing member 58 in such a manner that the part 56 and the sealing member 58 form one unit. The sealing replacement port 54 can be applied to any glove replacement section which becomes unnecessary to use. The sealing replacement port 54 shown in FIG. 11 is disposed, for example, at the end face of the glove replacement port 42 (as shown in FIG. 8 also) screwed into the fixed port 37 in such a manner that the pin 50 is in alignment with the pin hole 60. Thereafter, the same procedure as described before is carried out to install the sealing replacement port 54. The same procedure can be applied to the bag replacement port section.

If, as was described above, the sealing replacement ports 54 are employed at the port sections where normally the gloves 3 and 12 are scarcely used, wasting of gloves which are abandoned without being used during their serviceable periods of time can be eliminated. Accordingly, the replacement of such gloves and the inspection of such gloves can be eliminated also.

In the case when during the operation it is required to urgently provide the glove 12 or the bag 52 at the sealing replacement port section, the replacement can be quickly achieved by conducting the screwing operation in a manner similar to that in the replacement of the glove or the bag.

FIG. 12 illustrates a modified sealing replacement port. In this case, a replacement port 63 can be obtained by removing a part of the sealing member 58 of the cylindrical part 56 in the replacement port 54 thereby to provide a recessed section 62 with a bottom 61. Thus, the use of the sealing replacement port thus constructed can maintain the box sealed. In addition, an article or a material 65 can be readily put in to the shielding box 1 by the use of the sealing replacement port. More specifically, the article 65 is placed in the recessed section 62, and another sealing replacement port 64 having the same construction or the sealing replacement port 54 as shown in FIG. 11 is connected to the end face of the firstly-mentioned sealing replacement port. Then, the above-described screwing operation is carried out with the two replacement ports, the article 65 can be readily put into the shielding box 1.

FIG. 13 illustrates still another embodiment of this invention where a filter replacement port 69 with a filter 68 is mounted on the wall 2 of the shielding box 1. The filter is obtained by forming a cylindrical filter with glass fiber cloth. However, the filter may be fabricated with other material if it is suitable for sufficiently filtering the atmosphere in the shielding box. In this embodiment, the cylindrical replacement port is made of the same material as that of the filter 68. An elastic screw member 48, a pin 70 and a pin hole 71 are provided directly in the outer wall of the filter 68.

In the case where the filtering capacity is lowered and it is necessary to replace the filter replacement port with a new one all that is necessary is to screw a new filter replacement port having the same construction into the fixed port, as a result of which, the old filter replacement port 69 is allowed to drop into the shielding box 1.

A modified filter replacement port is shown in FIG. 14. In this example, similarly as in the case of the glove replacement port 42 or the bag replacement port 53, the filter replacement is of a rigid cylindrical member 73. Therefore, the inward compression force of the elastic screw member 48 screwed into the fixed port 37 is suppressed by the cylindrical member 73, as a result of which deformation of the filter 68 itself is prevented. Accordingly, this method is most applicable to the filter 68 which is of soft material.

Figure 15:
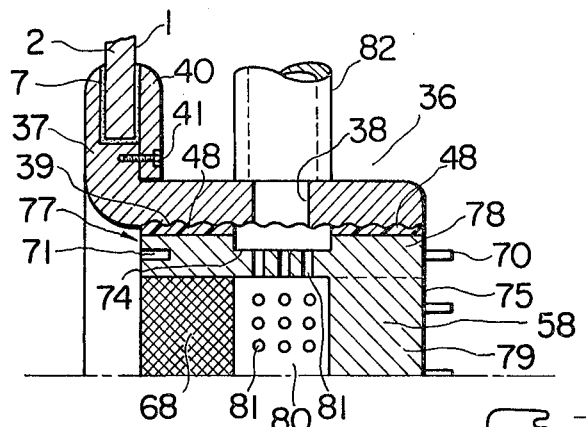

FIG. 15 illustrates another example of the filter replacement port section. In this example, there is provided a through-hole 38 in the part of the fixed port, which extends outside the shielding box 1. In the filter replacement port 75, a filter 68 is provided on the side of the free end 77 of a cylindrical member 76 having a central small diameter section 74 and a sealing member 58 as its bottom 79, and there are provided a number of through-holes in a part corresponding to the small diameter section 74 and between the filter 68 and the bottom 79. If when the filter replacement port 75 is mounted on the box, the small diameter section 74 is in alignment with the through-hole 38, the atmosphere cleaned by the filter 68 is delivered through the through-holes 81 of the filter replacement port 75, the central small diameter section 38, and the through-hole 74 of the fixed port 37 to the exhaust pipe 82 connected to the hole 74. In this connection, it goes without saying that similarly as in the above-described case, there is provided an elastic screw member 48 over the outer wall of the cylindrical member 78.

Figure 16:
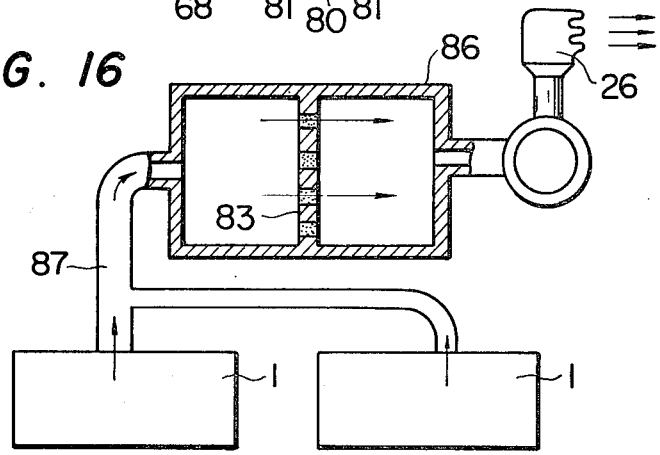
FIG. 16 is a schematic sectional view showing a filter room which is a part of the shielding box.
Figure 17:
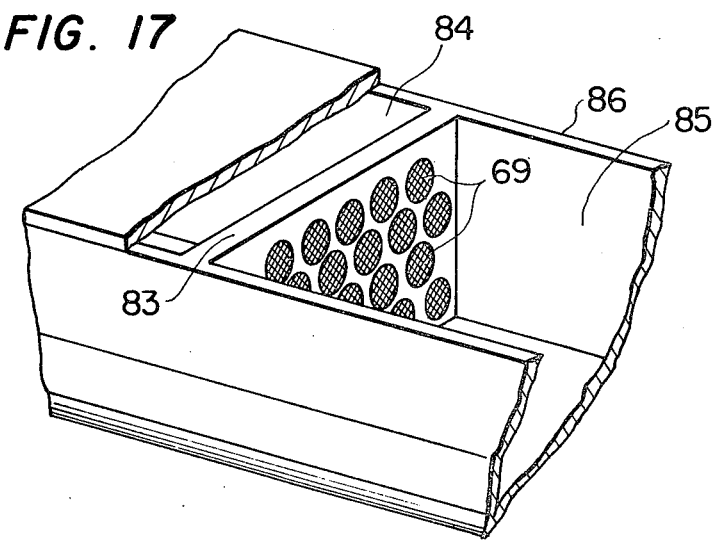
FIG. 17 is a perspective view, with parts cut away, showing the essential parts of the filter room.

FIG. 16 illustrates another example of the shielding box 1. Shielding boxes 1 are connected through a branched exhaust duct 87 to a filter room 86. Polluted air from each shielding box 1 is discharged from a stack 26 through the filter room 86. The filter room 86, as shown in FIG. 17, is divided into a polluted air room 84 and a clean air room 85 by an intermediate partition 83 provided with a number of filters 69. The port section shown in FIG. 13 or FIG. 14 can be employed to the respective filter sections of the intermediate partitition 83 in the filter room 86. As a worker can enter the clean air room 85 the replacement of the filters can be readily achieved. It goes without saying that the replacement is conducted by directing the new replacement port 69 or 72 toward the polluted air room 84.

The replacement of each filter can be achieved by a remote-controlled robot placed in the filter room 86.

In this connection, the filter replacement port 69 dropped into the polluted air room 84 can be taken out by providing the above-described glove port section or the bag port section on the wall of the polluted air room 84.

The elastic member may be of a viscous elastic material, so that the fixed port can be in close contact with the replacement port.

The fixed port 37 in FIGS. 8, 10, 11, 12, 13, 14 or 15 is fixedly mounted on the wall 2 of the shielding box 1 through the ring shaped packing 7. However, the wall 2 and the fixed port may be integrally formed. Further, although the elastic material having the threaded portion on its outer surface is provided on the outer peripheral surface of the replacement port, a plurality of annular projections may be used as a substitution for the thread.

As is apparent from the above-described various embodiments, according to this invention, when the glove, the bag, the filter, and the sealing member of the shielding box are replaced with new ones, the shielded material will scarcely leak out of the shielding box, and the replacement can be accomplished with high efficiency within an extremely short period of time.

What is claimed is:

1. A structure for replacably and sealingly mounting an operating member such as a glove, bag, and filter in a wall port of a radiation shielding box, comprising: a cylindrical fixed port member sealingly secured to a wall port of said shielding box and having a threaded portion on its inner periphery, a cylindrical replacement port member sized to fit within said fixed port member and having an operating member secured thereto, and an elastic member disposed on said replacement port member and having a threaded portion on its inner periphery corresponding to said threaded portion on the fixed port member and adapted to be threadingly inserted in a compressed and deformed stated between said fixed port member and said replacement port member.

2. A structure as claimed in claim 1, wherein said elastic member is fixedly provided on said replacement port member.

3. A structure as claimed in claim 2, wherein said replacement port member is made up of a first cylindrical portion larger in outside diameter and a second cylindrical portion smaller in outside diamter, said elastic member is fixedly provided on the outer wall of said first cylindrical portion, and said operating member is connected to said second cylindrical portion.

4. A structure as claimed in claim 3, wherein the inside diameter of said first cylindrical portion on which said elastic member is fixedly provided is larger than the outside diameter of said second cylindrical portion having said operating member.

5. A structure as claimed in claim 4, wherein the axial length of said first cylindrical portion is approximately equal to the axial length of said second cylindrical portion.

6. A structure as claimed in claim 5, wherein said first cylindrical portion is provided with a pin and a pin hole on its respective end faces.

7. A structure as claimed in claim 6, wherein said operating member is mounted on the outer periphery of said second cylindrical portion.

8. A structure as claimed in claim 6, wherein said operating member is provided on the inside of said second cylindrical portion.

9. A structure as claimed in claim 6, wherein said operating member is provided on the inside of said second cylindrical portion and is made of the same material as that of said second cylindrical portion.

10. A structure as claimed in claim 2, wherein said replacement port member and said operating member are integrally formed.

11. A structure as claimed in claim 2, wherein said fixed port member has a hole therein communicating with the outside, said replacement port member is composed of a cylindrical body having a reduced outside diameter at its central portion, an operating member constituting a filter is provided inside one end portion of said cylindrical body, an operating member constituting a sealing member is integrally provided inside the other end portion of said cylindrical body, and said central portion communicates with said hole.

12. A port section structure, comprising: a cylindrical fixed port member sealingly secured to a wall of a radiation shielding box and having a threaded portion on its inner periphery, a cylindrical replacement port member sized to fit within said fixed port member and having an operating member secured thereto, an elastic member disposed on said replacement port member and having a threaded portion on its outer periphery corresponding to said threaded portion on the fixed port member and adapted to be threadingly inserted in a compressed and deformed state between said fixed port member and said replacement port member, and a concave or convex section provided in at least one end portion of said replacement port member and engageble with a convex or concave portion of a like configured replacement port member.

13. A port section structure as claimed in claim 12, wherein said concave and convex sections comprise a pin and a pin hole, respectively.

14. A structure as claimed in claim 10, wherein a concave or a convex section is provided in at least one end face of said replacement port member and is adapted to be engaged with a convex or a concave section, respectively, provided in another replacement port member which can be screwed into said fixed port member.

15. A structure as claimed in claim 10, wherein said operating member comprises a bottom section of said cylindrical replacement port member.

* * * * *